UNITED STATES PATENT OFFICE.

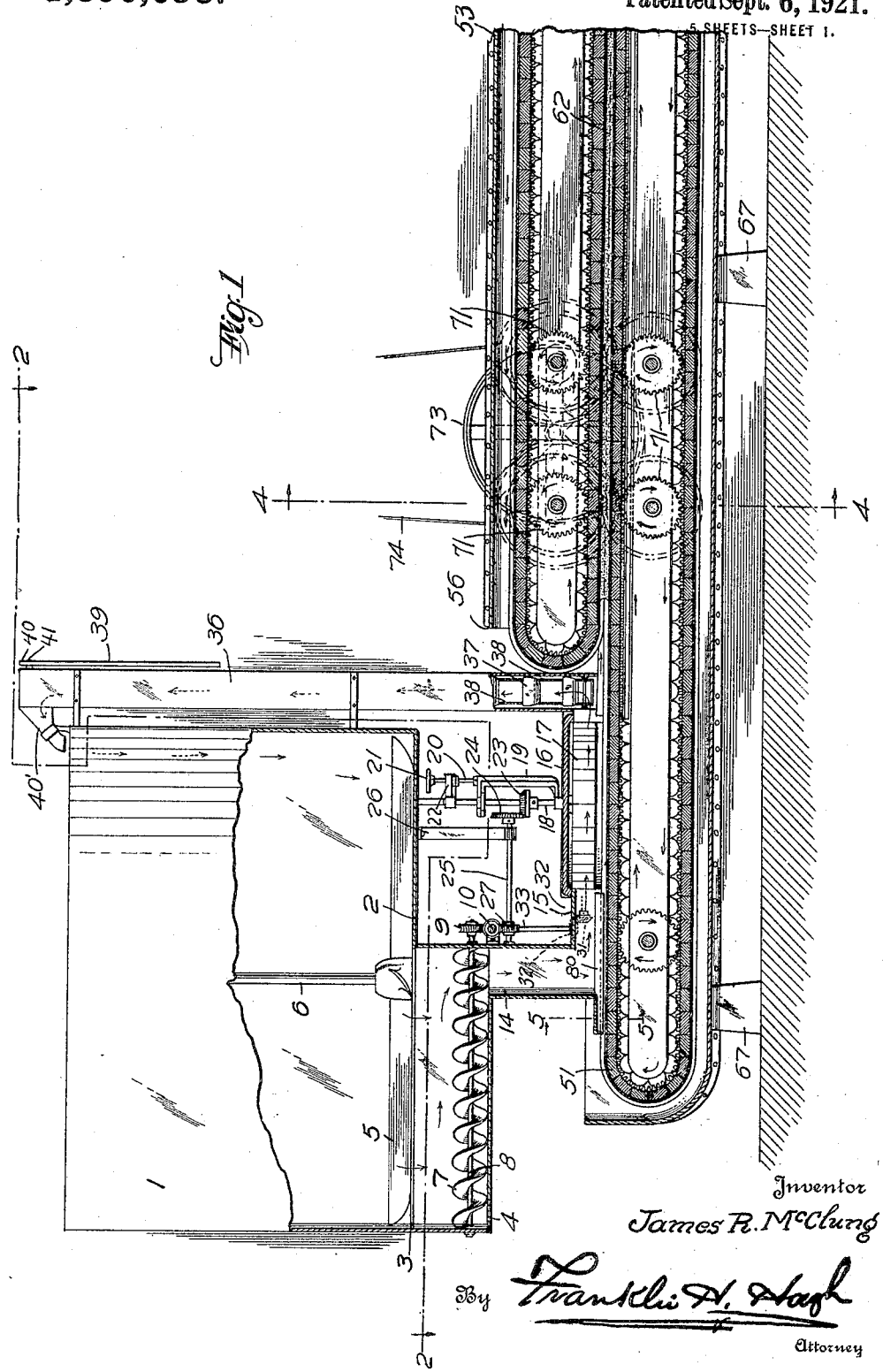

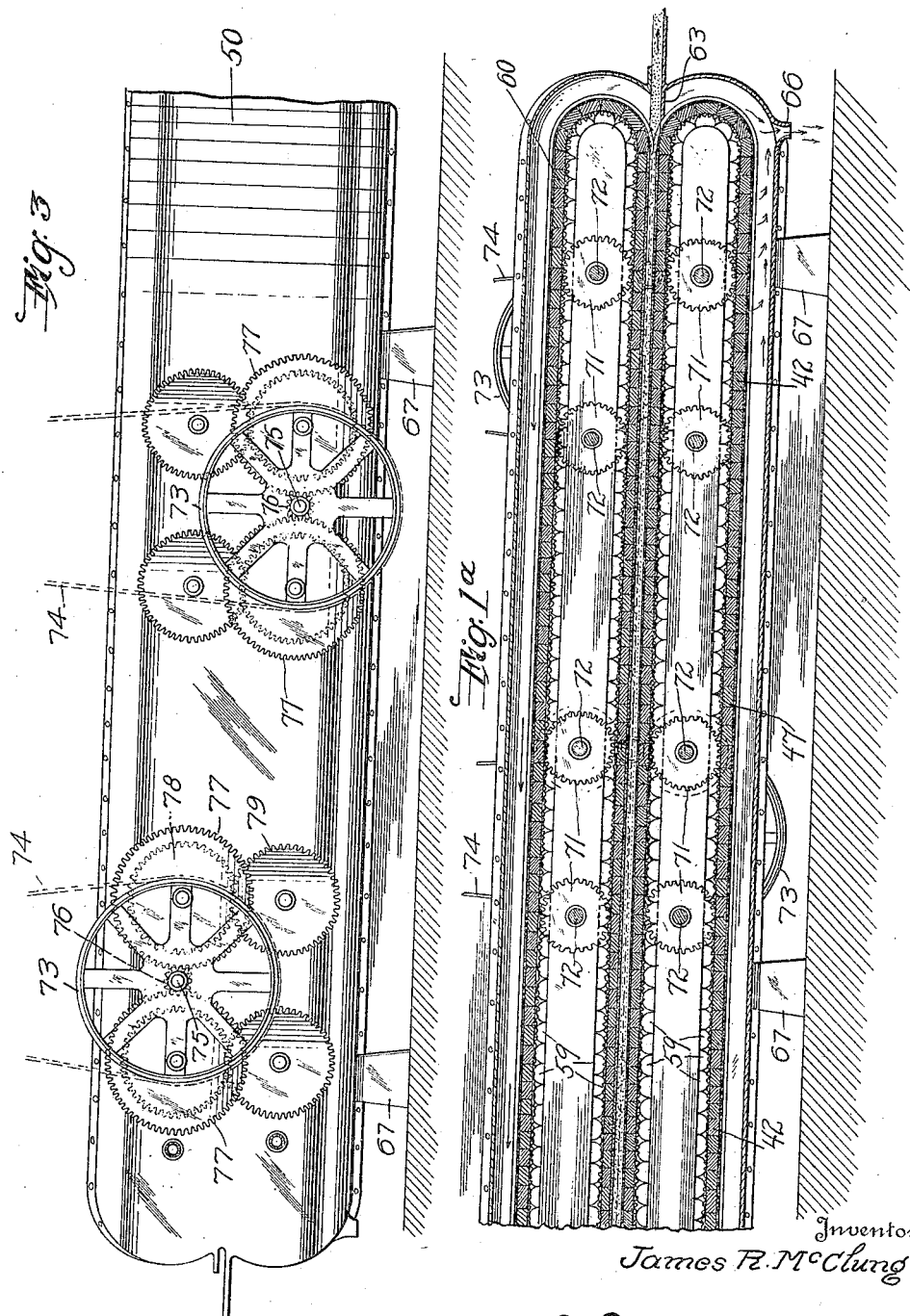

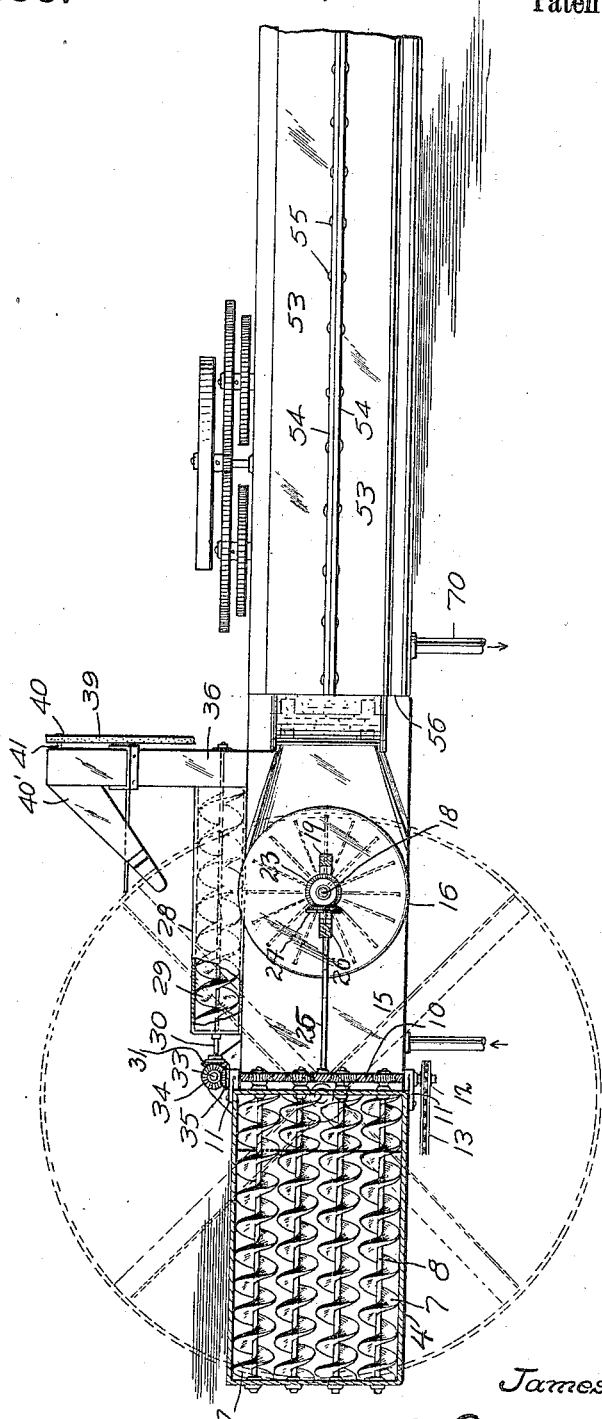

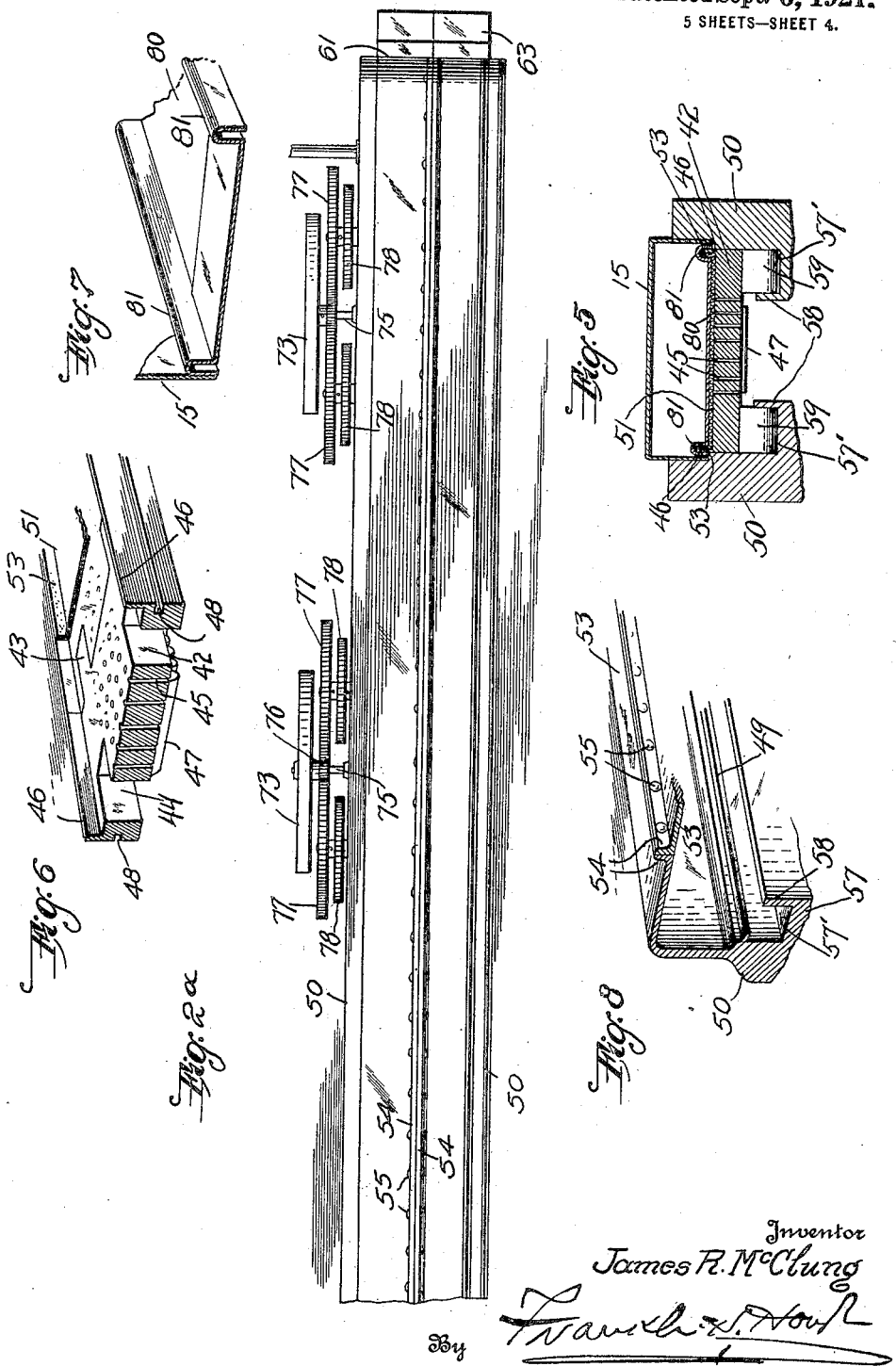

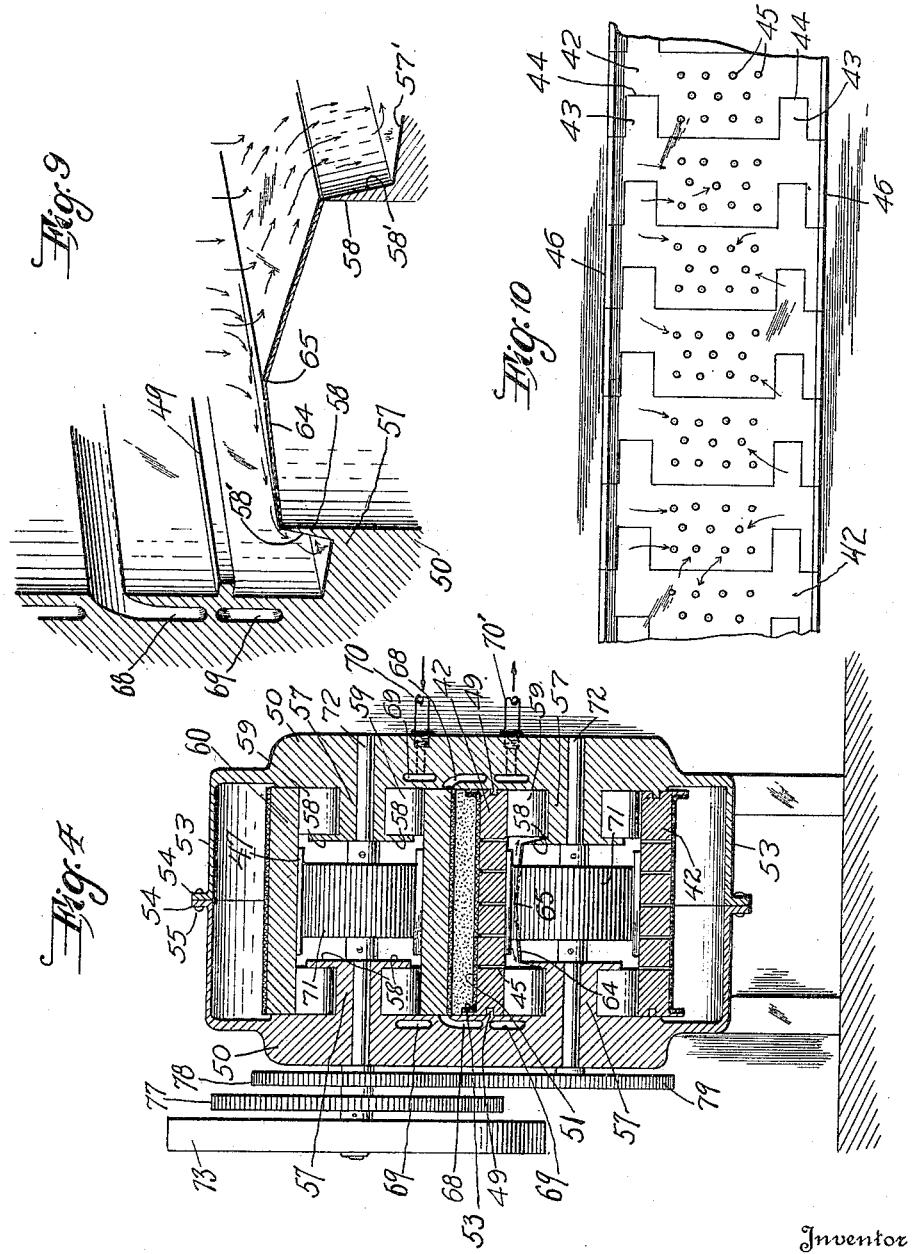

JAMES ROBERT McCLUNG, OF CARTER, OKLAHOMA.

COTTON-SEED-MEAL PRESS.

1,390,053.   Specification of Letters Patent.   Patented Sept. 6, 1921.

Application filed October 1, 1920. Serial No. 414,038.

*To all whom it may concern:*

Be it known that I, JAMES R. MCCLUNG, a citizen of the United States, residing at Carter, in the county of Beckham and State of Oklahoma, have invented certain new and useful Improvements in Cotton-Seed-Meal Presses; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a novel construction of press for extracting the oil from cotton seeds, which will be thoroughly efficient in operation and durable in use.

The preferred form of my press is shown in the accompanying drawings forming a part of the specification and in which like reference characters indicate corresponding parts throughout the several views. Briefly described:

Figure 1 is a view in central vertical longitudinal section of a portion of the press, fragments of one of the side walls of the hopper and the vertical tunnel in which the flight of bucket conveyers are contained being shown in elevation;

Fig. 1ª is a continuation of Fig. 1;

Fig. 2 is a horizontal sectional view along the line 2, 2 of Fig. 1; looking in the direction of the arrows;

Fig. 2ª is a continuation of Fig. 2;

Fig. 3 is a fragmentary view in side elevation of the horizontal press tunnel;

Fig. 4 is a transverse vertical sectional view on the line 4, 4 of Fig. 1, looking in the direction of the arrows;

Fig. 5 is a fragmentary view in transverse vertical section along the line 5, 5 of Fig. 1;

Fig. 6 is a fragmentary view in perspective of two of the metal blocks forming links in one of the press chains, and of one of the textile belts coöperating with said chain;

Fig. 7 is a fragmentary detail view of a peculiar form of metal plate disposed over one end of the lower press chain;

Fig. 8 is a fragmentary view in perspective, partly in section, of the horizontal press tunnel;

Fig. 9 is a fragmentary view in perspective, partly in section, of the horizontal press tunnel, showing more particularly the oil deflecting plate for guiding the oil into the side channels, or runways, of the tunnel, and Fig. 10 is a fragmentary view in top plan of the lower press chain.

Referring now in detail to the drawings:

1 designates an open-topped hopper, or reservoir, for the cotton seed meal, which reservoir may be heated, if desired, in any suitable manner, the bottom 2 of which is provided with an opening 3 toward one end thereof, communicating with a casing, or shell, 4, disposed therebeneath, for a purpose presently appearing.

Preferably agitating means are provided interior of the hopper 1 and may be of any suitable or conventional form, in this instance shown as comprising blades 5 radially carried at the lower end of a vertically positioned shaft 6, positioned concentrically within the hopper 1 and adapted to be rotated by any suitable means, not shown.

Disposed horizontally within the casing 4, preferably in proximity with the bottom thereof is a battery of screw conveyers, or Archimedian screws 7, in this instance four thereof being shown, although it is to be understood that any suitable number may be employed according to the size and capacity of the press. The shafts 8 of these screw conveyers are rotatably supported in the ends of the shell 4 through which ends they project. Any suitable means for driving the screw conveyers in synchronism may be employed and in this instance I have shown one of the exteriorly projecting ends of the shafts 8 as provided with pinions 9, meshing with a worm shaft 10, rotatably supported by bearings in brackets 11, 11 carried by the sides of the casing 4. Preferably, one of the ends of said worm shaft carries a belt pulley 12, over which passes an endless power belt 13, driven from any suitable source of power.

Communicating with the casing 4 through its bottom and at one end thereof is a vertical chute 14 extending transversely of said bottom the entire width thereof. Said chute is provided at its bottom with a right angular extension 15, comprising a top and side walls. The top of the extension 15 is provided with an opening normally closed by a cover 16.

Beneath said cover 16 is disposed a feeder comprising in this instance blades 17 radiating from a shaft 18, rotatably supported in bearings in said cover and projecting through the latter, as clearly shown in Figs. 1 and 2.

Suitable means for raising and lowering the cover 16 and the feeder 17 are provided and in this instance such means comprise a bracket 19 secured at one end thereof to the cover 16 and raisable and lowerable by a screw 20 swiveled at one end thereof in the top of said bracket and carrying a hand wheel 21 at the top thereof, the screw 20 being threaded through a stationary bracket 22.

Suitable means are provided for rotating the feeder 17, and in this instance such means comprise a beveled gear 23 fast on the shaft 18 so as to rotate therewith, the shaft 18 being slidable through said gear. The gear 23 meshes with a similar gear 24 on a counter shaft 25, rotatably supported in bearings in a bracket 26, carried by the bottom 2 of the reservoir. The shaft 25 at its other end carries a pinion 27, meshing with the worm shaft 10, whereby said shaft 25 and the meshing gears 23 and 24 are driven from the shaft 10.

Disposed to one side of the extension 15, in a casing 28, is a screw conveyer 29, the shaft 30 of which projects through the ends of said casing and one of the exteriorly projecting ends of said shaft carrying a beveled gear 31, meshing with a similar gear 32 on the bottom of a perpendicular shaft 33, carrying at its top a beveled pinion 34, meshing with a pinion 35 on one end of the worm shaft 10. It will be understood that the casing 28 communicates with the interior of the extension 15, so that the cotton seed meal is thrown by said separator 17 into said casing 28, whence the screw conveyer 29 feeds it toward the exit end of said casing into the bottom of a vertical tunnel 36, communicating with said casing at the exit end thereof.

Passing up and down within said tunnel 36 is an endless flight of conveyer buckets 37 supported upon conveyer chains 38, 38. Said endless flight of conveyer buckets is continuously moved in any suitable or conventional manner, as by means of the power belt 39 passing over a pulley 40, on a shaft 41, rotatably projecting within said tunnel 36 at the upper end thereof and connected up in the usual manner by means of geared connections,—not shown,—with the conveyer within said tunnel. As the conveyer buckets 37 reach their highest point and commence to turn over, they empty into a spout 40' at the upper end of the tunnel 36, the exit end of said spout being disposed over the reservoir 1 at one end thereof as shown in Figs. 1 and 2.

The operation of that portion of the construction so far described is as follows: The cotton seed meal contained in the reservoir 1 passes therefrom through the opening 3 into the casing 4, whence it is fed by the battery of screw conveyers 7 toward the exit end of the latter, the meal dropping down through the chute 14 and thence passing into the extension 15 to the spider wheel 17. The spider wheel acts to strike the meal off level to the desired thickness. It will be noted that only a layer of meal of predetermined thickness may pass beneath the spider wheel, the remainder of the bulk of meal passing through the extension 15 being taken up between the blades of the spider wheel and carried around by them and thrown into the casing 28 where the meal is fed by the screw conveyer 29 into the bottom of the tunnel 36 where it is elevated by the conveyer buckets 37 and dumped into the spout 40, whence it falls by gravity into the reservoir 1 at the top thereof.

Passing beneath the chute 14 and the extension 15 thereof is an endless metallic belt formed in a peculiar manner. This belt, as shown most clearly in Figs. 6 and 10 is composed of a series of metallic links 42 which have a tongue and groove connection with each other, as shown at 43 and 44, and each of said links being provided with a plurality of apertures 45 extending transversely therethrough. Each of said links is also provided with upward projecting marginal flanges 46 at the top thereof, the word "top" being used with reference to the position of the links, as shown in said figures. Each of said links is also provided along its sides with grooves 48, 48, which, as shown in Fig. 4, are engaged by ribs 49, 49, projecting inward from the side walls 50, 50 of the casing, or tunnel, in which said chain is housed.

This endless chain, made up of links just described, is provided with a textile belt 51, preferably hair cloth.

The longitudinal margins of this textile belt 51 are bent upward to provide flanges 53, 53 which bear against the inner surface of the upright flanges 46 of the metallic belt previously described. It will be seen that the textile belt 51 is assembled with the steel belt so as to be in close contact therewith, said textile belt bearing flatly against one face of said steel belt. The tunnel, or casing, in which the belts travel is preferably constructed, as before indicated, of two complemental castings 50, 50 of the desired length, said castings being made the required thickness to withstand the weight imposed upon them and being provided at their top and bottom with flanges 53, 53 which abut at their adjacent ends and are provided at such adjacent ends with upturned terminals 54, 54 which are riveted or bolted together, as shown at 55. As shown in Figs. 1 and 2 the flanges 53, 53 extend for a portion only of the length of the tunnel, terminating at the line 56.

Each of said castings 50, 50 is provided on its inner surface with two longitudinally extending parallel ribs 57, 57, each of which is provided along its inner side with upward and downward projecting marginal flanges 58, 58, whereby runways are provided for anti-friction rollers 59, one endless series of these rollers being interposed between the ribs 57 and the endless metallic belt made by the sections 42, and the other endless series of rollers disposed above the first series, being interposed between the upper ribs 57 and a second belt 60, made up of metallic sections similar to the belt sections 42, and which may be perforated like the lower belt already described.

The upper and lower series of ribs 57 are disposed slightly convergent,—that is to say, the distance between them, measured at a point approximately in the plane of the line 56 gradually decreases to the end 61 (see Fig. 2ᵃ) of the tunnel, so that the space between the two belts, as shown in Fig. 1, and through which space the cotton seed meal 62 passes, gradually decreases in depth from the point where said meal enters between said belts, to the point where it passes from between said belts onto a shelf 63 projecting through the tunnel at the far end thereof, as shown in Fig. 1ᵃ. Thus, as the meal 62 passes between the two belts, it is gradually compressed to increasing density, thus pressing all of the oil out of the meal.

The upper runway of the rollers 59, on which the lower belt 42 travels, constitutes a channel for the collection of the oil that is expressed from the cotton seed meal. As the oil seeps through the apertures 45 in the belt 42 it falls upon a deflector comprising a plate 64 extending longitudinally beneath the upper section of the lower belt 42 and bent longitudinally as shown at 65 centrally of the width thereof so as to present inclined portions, as clearly shown in Figs. 4 and 9, said inclined portions resting at their lower ends upon the top of the flanges 58 of the lower series of ribs 57. The oil thus dropping upon the plate 64 flows down the same and down the inclined face 58′ of the flanges 58 onto the roller bed 57′ of the rollers 59. The oil thence passes along these troughs, or channels, to an exit opening 66, disposed at the bottom and at one end of the tunnel. It is to be understood, of course, that the tunnel is to be placed in a slightly inclined position so that one end thereof, being that end adjacent the exit opening 66, is nearer the ground than the opposite end of the tunnel, said tunnel being conveniently supported upon standards 67.

I prefer to provide longitudinally extending grooves, or channels, 68, 68 in the castings 50, 50, said channels being curved at their top and terminating at this point flush with the inner surface of said tunnel walls 50, 50, so that the oil escaping between the chains 42 and 60 and the inner surface of the walls 50, 50 may escape into the longitudinally extending channels 68, 68, said channels leading to the exit 66.

The castings, or walls, 50, 50 of the tunnel are also provided with a passage, or passages, 69 communicating with a pipe 70 tapped into one of the walls 50 and communicating with a source of steam supply whereby steam may pass through the channels 68 and out through a suitable exit pipe 70′ for the purpose of keeping the meal hot, causing the oil to be more easily and completely extracted from the meal.

Meshing with the racks 47 of the upper and lower belts 42 and 60 is a plurality of pinions 71, each of which is carried by an axial shaft 72 projecting transversely through the side walls 50, 50 of the tunnel.

The invention comprehends suitable means for simultaneously rotating the pinions 71 and the preferable means is shown in the drawings and will now be described. Referring particularly to Figs. 2, 3 and 4, it will be seen that I have provided a series of belt pulleys 73. Around each belt pulley 73 passes a power belt 74, driven from any suitable source of power,—not shown. Each belt pulley 73 is carried on an axial shaft 75 on which is a pinion 76 meshing at diametrically opposite points with gear wheels 77, 77 on the shafts 72 supporting the rack pinions 71. Also supported upon each of said upper shafts 72 is a gear wheel 78, meshing with a similar gear 79 on the shaft 72 of one of the lower pinions 71.

Referring now more particularly to Figs. 1, 5 and 7, it will be noted that I have provided a plate 80, disposed at the bottom of the chute 14 and the extension 15 thereof, said plate overlying the lower textile belt 51 and being provided with longitudinally extending curved marginal flanges 81, 81 arching over the flanges 53 of the belt 51 and over the flanges 46 of the metallic belt, said plate being secured in any suitable manner against upward displacement. It will thus be noted that the plate 80 forms the bottom of the chute 14 and that one end of the plate terminates in proximity to the spreader 17.

In operation, it will be seen that the cotton seed meal travels between the upper and lower belts, and, since, by the construction described, the space between said belts constituting the channel through which the meal passes, is of gradually decreasing depth from the point where the meal enters between the belts to the point where it leaves the belts and passes out of the tunnel along the shelf, or platform, 63, the meal is gradually compressed and the oil entirely extracted from the same before it leaves the tunnel.

What I claim to be new is:

1. In a press, having two endless superposed belts, slightly spaced apart, one of said belts being slightly longitudinally inclined with reference to the other belt, so that the space between the two belts is of gradually decreasing depth, a hopper for cotton seed meal, a chute leading from said hopper for conveying said cotton seed meal from said hopper to said belts, a rotatable meal spreading member interposed between said chute and the point where the meal passes between said belts, said spreader comprising a spider wheel having a plurality of radial blades disposed slightly above the lower belt, a portion of the meal passing through said chute and beneath said wheel to the passage between said belts, and a portion of said meal being taken up by said wheel, the combination of means including an endless series of conveyer buckets for conveying back to the hopper the meal taken up by said wheel.

2. In a press, having two endless superposed belts, slightly spaced apart, one of said belts being slightly longitudinally inclined with reference to the other belt, so that the space between the two belts is of gradually decreasing depth, a hopper for cotton seed meal, a chute leading from said hopper for conveying said cotton seed meal from said hopper to said belts, a rotatable meal spreading member interposed between said chute and the point where the meal passes between said belts, said spreader comprising a spider wheel having a plurality of radial blades disposed slightly above the lower belt, a portion of the meal passing through said chute and beneath said wheel to the passage between said belts, and a portion of said meal being taken up by said wheel, the combination of a screw conveyer receiving said meal from said wheel, and an endless series of conveyer buckets receiving said meal from said screw conveyer.

3. In a press the combination of a casing, two endless superposed belts within said casing and slightly spaced apart, one of said belts being slightly longitudinally inclined with respect to the other belt, and both of said belts being perforated, said casing being provided interiorly with longitudinally extending channels, and a deflector disposed beneath said lower perforated belt and leading the oil passing through said perforations in the belt to said channels.

4. In a press, the combination of a casing, two endless superposed belts within said casing and slightly spaced apart, one of said belts being slightly longitudinally inclined with respect to the other belt, and both of said belts being perforated, said casing being provided interiorly with longitudinally extending channels, a deflector disposed beneath said lower perforated belt and leading the oil passing through said perforations in the belt to said channels, and anti-friction rollers disposed in said channels and supporting said perforated belt.

5. In a press, the combination of a casing, two endless superposed belts disposed in said casing and slightly spaced apart, one of said belts being longitudinally inclined with respect to the other belt, longitudinally extending ribs carried interiorly by said casing, the lower belt having longitudinally extending grooves engaged by said ribs.

6. In a press, the combination of two endless superposed compound belts slightly spaced apart, one of said belts being longitudinally inclined with respect to the other belt, each of said compound belts comprising a plurality of metallic sections, each of said metallic sections of the lower belt being provided with side marginal flanges, and a textile facing strip disposed over one face of said metallic sections and provided with longitudinally extending marginal flanges bearing against said metallic flanges.

In testimony whereof I hereunto affix my signature.

JAMES ROBERT McCLUNG.